United States Patent
Butterworth et al.

(10) Patent No.: US 10,237,008 B2
(45) Date of Patent: Mar. 19, 2019

(54) SYNCHRONIZATION WITH DIFFERENT CLOCK TRANSPORT PROTOCOLS

(71) Applicant: Apple Inc., Cupertino, CA (US)

(72) Inventors: Ashley I. Butterworth, Santa Clara, CA (US); Daniel C. Klingler, Mountain View, CA (US); Simon E. C. Goldrei, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/275,316

(22) Filed: Sep. 23, 2016

(65) Prior Publication Data

US 2017/0359138 A1 Dec. 14, 2017

Related U.S. Application Data

(60) Provisional application No. 62/348,782, filed on Jun. 10, 2016.

(51) Int. Cl.
*H04J 3/16* (2006.01)
*H04J 3/06* (2006.01)
*H04L 29/06* (2006.01)

(52) U.S. Cl.
CPC .......... *H04J 3/0661* (2013.01); *H04J 3/0664* (2013.01); *H04L 69/08* (2013.01); *H04L 69/28* (2013.01); *H04J 3/0673* (2013.01)

(58) Field of Classification Search
CPC .................................................. H04J 3/0661
USPC ........................................................ 370/466
See application file for complete search history.

(56) References Cited

U.S. PATENT DOCUMENTS

| 7,280,593 | B2 * | 10/2007 | Hoobler ............... H04L 7/0008 370/280 |
|---|---|---|---|
| 8,185,674 | B2 | 5/2012 | Moore et al. |
| 8,675,665 | B2 | 3/2014 | Umayabashi et al. |
| 8,971,357 | B2 | 3/2015 | Bui et al. |
| 9,547,332 | B1 * | 1/2017 | Mizrahi ..................... G06F 1/10 |
| 2011/0002429 | A1 * | 1/2011 | Williams .............. H04J 3/0632 375/356 |
| 2012/0257700 | A1 * | 10/2012 | Belisomi ................... H04J 3/04 375/362 |

(Continued)

*Primary Examiner* — Christopher R Crompton
(74) *Attorney, Agent, or Firm* — Womble Bond Dickinson (US) LLP

(57) ABSTRACT

A bridge element is provided for establishing clock synchronization across network elements including a first network element using a first clock synchronization transport protocol and a second network element using a second clock synchronization transport protocol different from the first clock synchronization transport protocol. The bridge element includes a port, a protocol translation port and an interconnect structure. The port may receive a clock synchronization signal from the first network element using the first clock synchronization protocol. The interconnect structure may receive the clock synchronization signal from the port. The protocol translation port may receive the clock synchronization signal from the interconnect structure, translate the clock synchronization signal between the first clock synchronization transport protocol and the second clock synchronization transport protocol, and provide the translated clock synchronization signal to the second network element using the second clock synchronization protocol.

9 Claims, 7 Drawing Sheets

(56) References Cited

U.S. PATENT DOCUMENTS

| | | | |
|---|---|---|---|
| 2013/0301643 A1* | 11/2013 | Soulie | G06F 13/4018 |
| | | | 370/392 |
| 2015/0244513 A1 | 8/2015 | Hartman | |
| 2016/0218818 A1* | 7/2016 | Lorenz | H04J 3/065 |
| 2016/0350259 A1* | 12/2016 | Jeon | G06F 13/364 |
| 2017/0125027 A1* | 5/2017 | Filippini | G10L 19/167 |

* cited by examiner

SYNCHRONIZATION WITH DIFFERENT CLOCK TRANSPORT PROTOCOLS

CROSS-REFERENCE TO RELATED APPLICATIONS

This application claims the benefit of U.S. Provisional Application No. 62/348,782 filed Jun. 10, 2016, the contents of which are hereby incorporated by reference as if fully stated herein.

FIELD

One aspect of the disclosure herein relates to synchronizing time between devices in a network, and more particularly relates to determining the reliability of a timestamp.

BACKGROUND

Time synchronization between interconnected nodes in a network is often important to operation of the nodes. Time synchronization typically involves sharing time synchronization messages between the nodes so that nodes (often called slave nodes) may synchronize their own clocks in accordance with the clock of a node that has been designated the master node. For example, a master node sends a time synchronization message to a slave node at a first time indicated by a timestamp T1. The slave node receives the time synchronization message including the timestamp T1 and notes the local time T1' when the message is received. The slave node calculates a network transit time, which is the time it takes for the time synchronization message to travel from the slave node to the master node, by sending a message to the master node at a time T2. The master node receives this message at a time T2' and sends a message back to the slave node including the timestamp T2'. Based on T1, T1', T2 and T2', the slave node calculates an offset between the clock of the master node and the clock of the slave node. The slave node may use the offset information to adjust its local clock into agreement with the clock of the master node. Fluctuations in the delay of the network, jitter or noise often affects the accuracy of a timestamp included in a time synchronization message, such that time synchronization is sometimes inaccurate between the master and slave nodes.

BRIEF DESCRIPTION OF THE DRAWINGS

The embodiments herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one. Also, in the interest of conciseness and reducing the total number of figures, a given figure may be used to illustrate the features of more than one embodiment, and not all elements in the figure may be required for a given embodiment.

DETAILED DESCRIPTION

Figure 1:
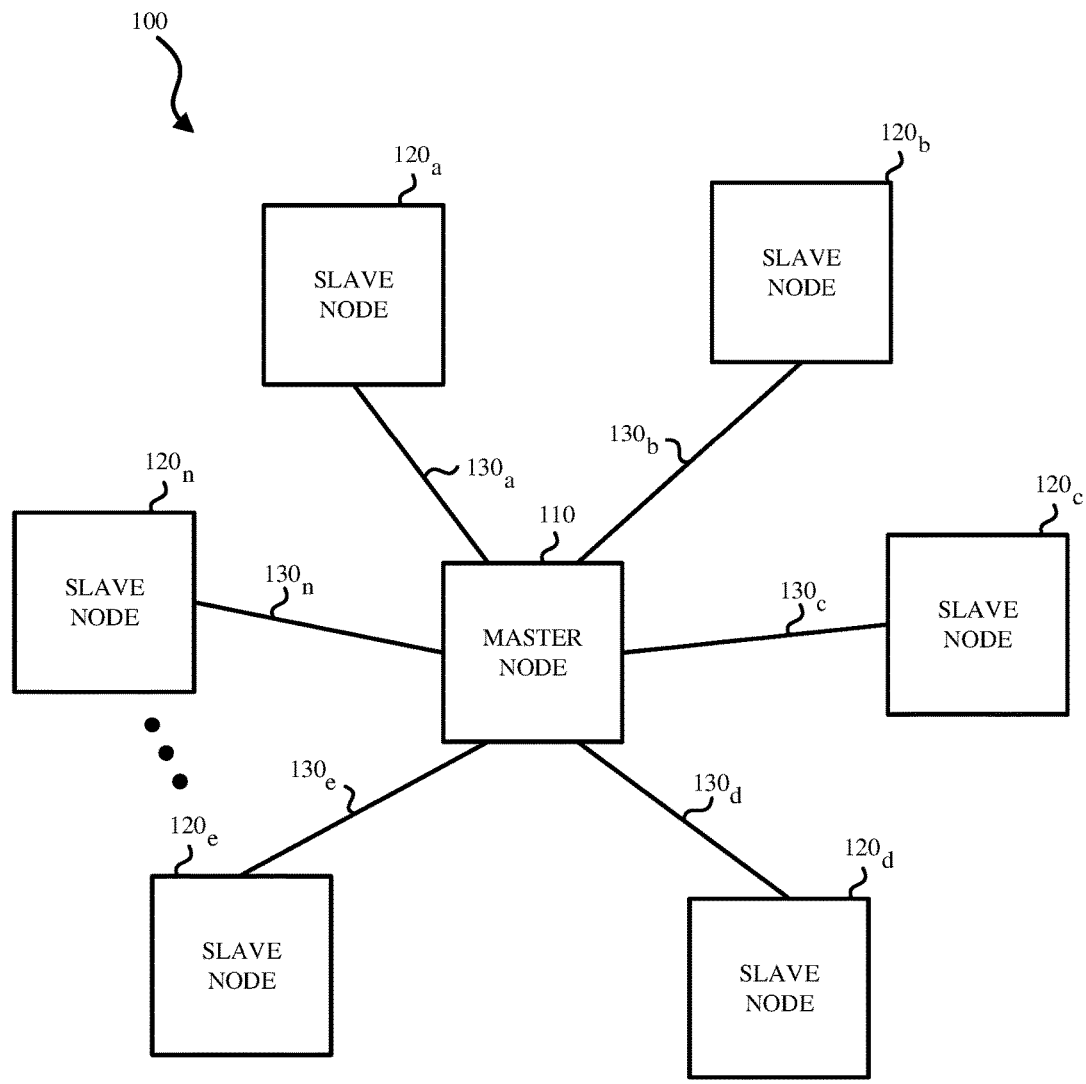
FIG. 1 is a representational view for explaining interconnected nodes in a first example network according to an embodiment herein.

Several embodiments are now explained with reference to the appended drawings. Whenever aspects are not explicitly defined, the embodiments are not limited only to the parts shown, which are meant merely for the purpose of illustration. Also, while numerous details are set forth, it is understood that some embodiments may be practiced without these details. In other instances, well-known circuits, structures, and techniques have not been shown in detail so as not to obscure the understanding of this description.

As used herein, the term "network" refers without limitation to any network configured to transfer data as groupings called packets. Packet networks can deliver streams of data (composed sequences of packets) to a community of devices. During transfer, packets are buffered and queued, and may experience variable delays and throughput depending on the traffic load in the network. As used herein, the term "master" or "upstream" node refers to a device or interface configured to packetize information for transfer via a packet-based network. The terms "slave" or "downstream" node refers to a device or interface configured to extract information from a packet. A "node" refers to a device which receives packets, and forwards the packets to another device. The term "timestamp" refers to any indication (sequence of characters or encoded information) of when a certain event occurred as determined by a clock of a node. These definitions are not considered to be limiting and are made only to clarify various aspects discussed herein.

The inventors herein have recognized that various characteristics of clocks of network nodes and links between the network nodes may impact an amount of noise included in a timestamp and the accuracy of time synchronization. For instance, nodes may be connected to a network using different types of links, such as a wired link (e.g., Ethernet) or a wireless link. In addition, each type of link may have different accuracy metrics for performance of time synchronization. Also effecting accuracy of time synchronization is the type of timestamping used by a node to generate a timestamp, such as a hardware-implemented process or a software-implemented process. Accordingly, timestamps received by a node may be reliable or unreliable depending on the type of link used by an upstream node to send the time synchronization message and timestamp and depending on the type of timestamping used by the upstream node.

An embodiment herein addresses the foregoing by performing time synchronization between nodes in a network with greater accuracy, even in situations where nodes are connected by different types of links and use different types of timestamping, by determining reliability of a received timestamp. Reliability of the timestamp may be determined based on several factors, including information regarding the accuracy of a clock in the upstream node (which may be provided by a manufacturer of the clock), a type of timestamping used by the upstream node (e.g., hardware or software), a type of link used by the upstream node to send the time synchronization message and the timestamp (e.g., wired or wireless) and clock drift parameters (e.g., crystal performance relative to temperature of the crystal). This quality information may be shared between the nodes in a time synchronization message or in a separate quality message.

In one embodiment, the quality information is received by a node, and the node generates an accumulated chain of quality information by adding its own local quality information to the received quality information and sends the accumulated quality information to a downstream node. In another embodiment, the quality information is received by a node and processed by the node to generate an adjusted timestamp and adjusted chain of quality information to send to a downstream node.

Based on the chain of quality information, a node determines whether a received timestamp is reliable or unreliable. For example, if the chain of quality information indicates that the type of timestamping used by a master node is hardware timestamping and that the type of link being used by the master node to send a time synchronization message including a timestamp is a wired link, a slave node determines that the master clock is reliable and that timestamps generated by the master clock are reliable (e.g., accurate within nanoseconds). In this case, the node determines parameters for a filter that is applied to a sequence of received timestamps such that the filtering is not aggressive. On the other hand, if the chain of quality information indicates that the type of timestamping used by the master node is software timestamping and that the type of link being used by the master node to send a timestamp included in a time synchronization message is a wireless link, the slave node determines that the master clock is unreliable and that timestamps generated by the master clock are unreliable (e.g. inaccurate by tens of milliseconds). In this case, the node determines parameters for a filter that is applied to a sequence of received timestamps such that the filtering is aggressive.

By virtue of the arrangements described herein, it is possible to determine reliability of a received timestamp by extracting chain of quality information of upstream nodes, thereby improving accuracy of time synchronization.

FIG. 1 is a representational view illustrating interconnected nodes in a first example network according to an embodiment herein. In the illustrated embodiment, the network 100 includes a master node 110 in communication with a number of slave nodes 120 (individually slave nodes 120a, 120b, 120c, 120d, 120e . . . 120n) through links 130 (individually links 130a, 130b, 130c, 130d, 130e . . . 130n), respectively. Nodes 110 and 120 are, for example, servers, computers (desktop, laptop, handheld, etc.), routers, firewalls, gateways, network and personal media devices, electronic devices and mobile devices, etc.

Each of nodes 110 and 120 is generally a time-aware system including its own local clock source, and each of slave nodes 120 is capable of synching its own local clock with the clock of a node that has been designated as a master node (such as master node 110.) Each of nodes 110 and 120 generates a timestamp using its clock and a type of timestamping process, such as a hardware-implemented process or a software-implemented process. For example, with respect to hardware-implemented timestamping, when a message departs from or arrives at a node, special hardware generates a timestamp from the local clock. With respect to software-implemented timestamping, when a message reaches the application layer of a node, a processor executes a software program or computer-executable method stored in a memory in order to generate a timestamp based on the local clock. Generally, a timestamp generated by a hardware-implemented process is more accurate than a timestamp generated by a software-implemented process.

Links 130 are of a wired type (e.g., Ethernet) or a wireless type, and each type of link between master node 110 and slave nodes 120 has different accuracy metrics for performance of time synchronization. For example, a timestamp provided in a time synchronization message over a wired link type is typically more accurate than a timestamp provided in a time synchronization message over a wireless link type.

Using links 130, master node 110 sends a time synchronization message to slave nodes 120 including a timestamp generated by the clock source of master node 110. In addition, master node 110 generates and sends chain of quality information to slave nodes 120. The chain of quality information may be included in the time synchronization message, or alternatively may be provided in a separate quality message at a same or different timing. The chain of quality information may indicate, among other things, information regarding the accuracy of the clock of master node 110, a type of timestamping used by the master node 110 (e.g., hardware or software), a type of link used by master node 110 to send the time synchronization message including the timestamp (e.g., wired or wireless) and clock drift parameters of the clock of master node 110 (e.g., crystal performance relative to temperature of the crystal). This process is described in more detail below in connection with FIG. 3.

Figure 2:
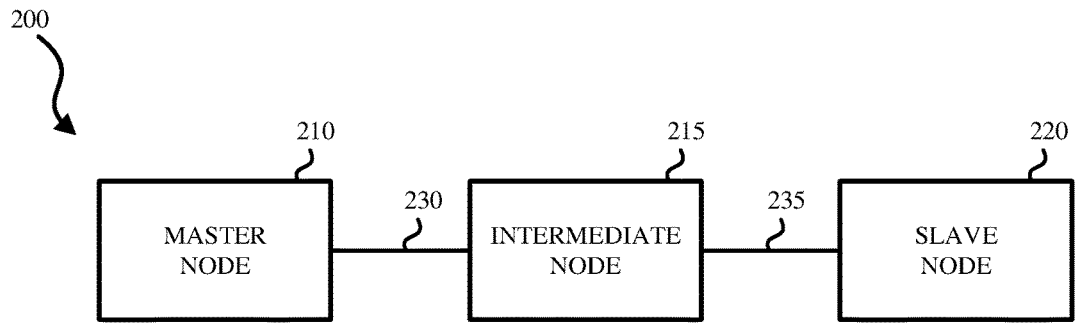
FIG. 2 is a representational view for explaining interconnected nodes in a second example network according to an embodiment herein.

FIG. 2 is a representational view illustrating interconnected nodes in a second example network according to an embodiment herein. In the illustrated embodiment, the network 200 includes master node 210 in communication with intermediate node 215 through link 230, and slave node 220 in communication with intermediate node 215 through link 235. The network elements (nodes, links) illustrated in FIG. 2 are similar to the network elements illustrated in FIG. 1; however, the elements have a different topological arrangement in which an intermediate node (215) is provided between a master node (210) and a slave node (220). Accordingly, similar to the embodiment of FIG. 1, nodes 210, 215 and 220 are, for example, servers, computers (desktop, laptop, handheld, etc.), routers, firewalls, gateways, network and personal media devices, electronic devices and mobile devices, etc.

Also similar to FIG. 1, each of nodes 210, 215 and 220 is generally a time-aware system including its own local clock source, and nodes 215 and 220 are capable of synching their own local clocks with the clock of a node that has been designated as a master node (such as master node 210.) Each of nodes 210, 215 and 220 generates a timestamp using a type of timestamping process, such as a hardware-implemented process or a software-implemented process. As in FIG. 1, with respect to hardware-implemented timestamping, when a message departs from or arrives at a node, special hardware generates a timestamp from the local clock. With respect to software-implemented timestamping, when a message reaches the application layer of a node, a processor executes a software program or computer-executable method stored in a memory in order to generate a timestamp based on the local clock. Generally, a timestamp generated by a hardware-implemented process is more accurate than a timestamp generated by a software-implemented process.

Links 230 and 235 are of a wired type (e.g., Ethernet) or a wireless type, and each type of link 230, 235 has different accuracy metrics for performance of time synchronization. As in FIG. 1, a timestamp provided over a wired link type is typically more accurate than a timestamp provided over a wireless link type.

Using link 230, master node 210 sends a time synchronization message to intermediate node 215 including a timestamp generated by the clock source of master node 210. In addition, master node 210 sends chain of quality information to intermediate node 215 using link 230. The chain of quality information may indicate, among other things, information regarding the accuracy of the clock of master node 210, a type of timestamping used by the master node 210 (e.g., hardware or software), a type of link used by master node 210 to send the time synchronization message including the timestamp (e.g., wired or wireless) and clock drift parameters of the clock of master node 210 (e.g., crystal performance relative to temperature of the crystal).

Figure 4:
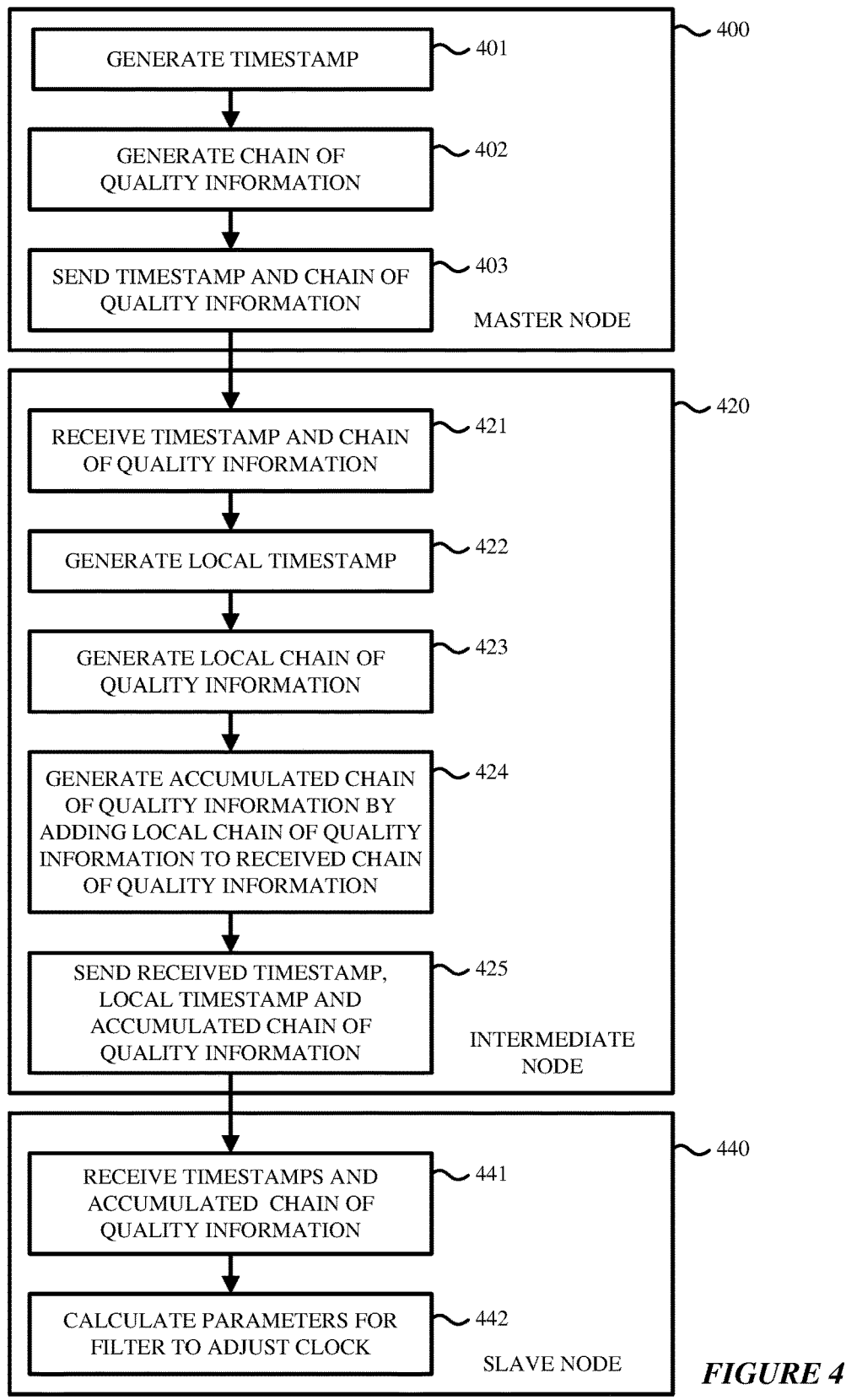
FIG. 4 is a flow diagram for explaining a time synchronization process between a slave node and a master node having an intermediate node therebetween according to an embodiment herein in which chain of quality information is accumulated by the intermediate node.
Figure 5:
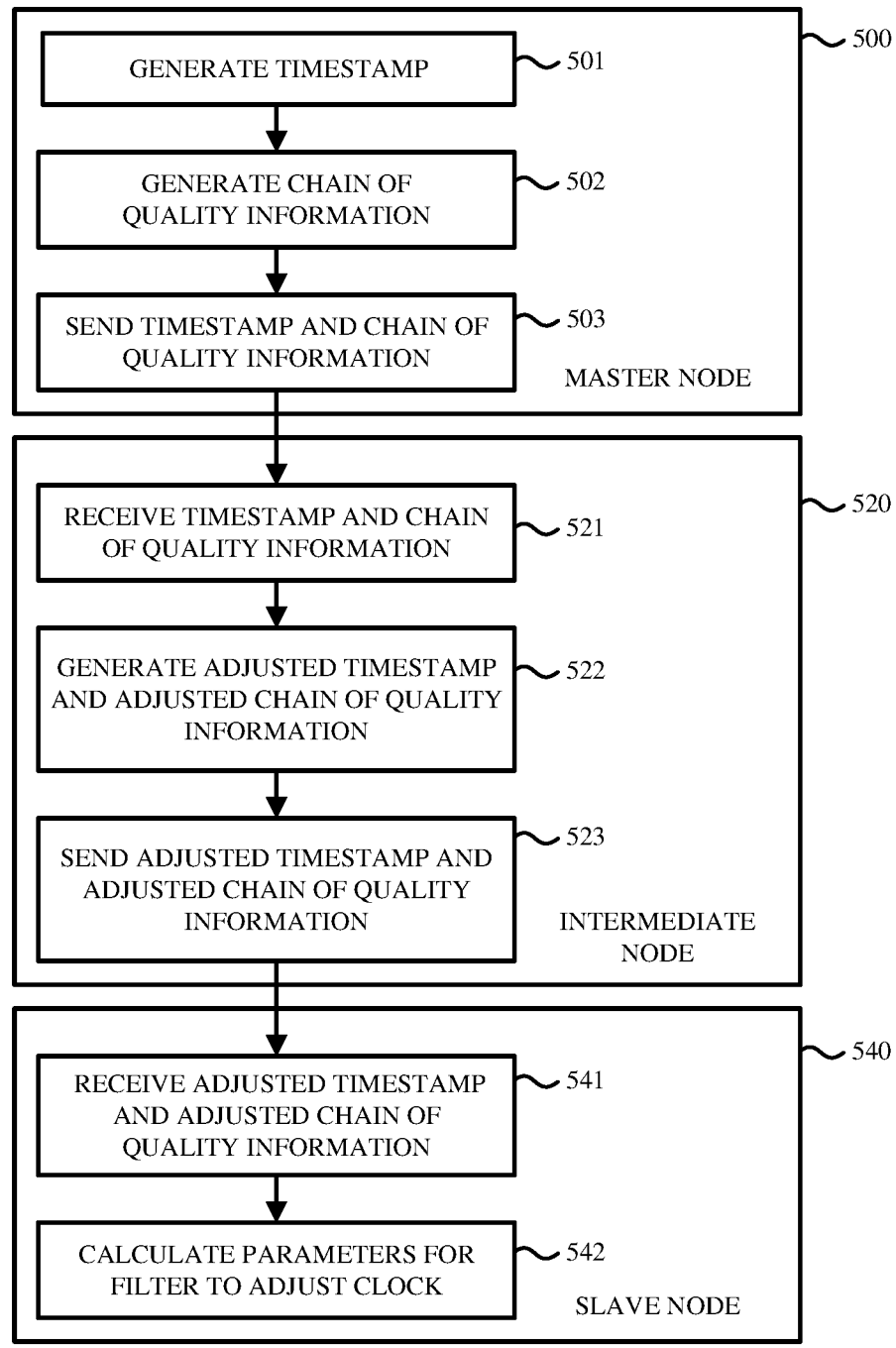
FIG. 5 is a flow diagram for explaining a time synchronization process between a slave node and a master node having an intermediate node therebetween according to an embodiment herein in which chain of quality information is adjusted by the intermediate node.

Using link 235, intermediate node 215 sends a time synchronization message to slave node 220. In addition, intermediate node 215 sends chain of quality information slave node 220. FIG. 4 illustrates an embodiment in which intermediate node 215 generates and sends accumulated chain of quality information, and FIG. 5 illustrates an embodiment in which intermediate node 215 generates and sends adjusted chain of quality information.

The chain of quality information sent by master node 210 and intermediate node 215 may be included in the time synchronization message, or alternatively may be provided in a separate quality message at a same or different timing.

Although FIGS. 1 and 2 illustrate two example network configurations, it will be understood that the disclosure herein relates to any configuration of networks, including point-to-point networks, networks connected by a bus, star networks, ring networks, mesh networks, hybrid networks, and daisy chain networks.

In addition, a network may have any number of nodes. For example, the network configuration of FIG. 2 may have one or more additional intermediate nodes in addition to intermediate node 215, provided in between master node 210 and slave node 220. In addition, the network configuration of FIG. 1 may have any number of intermediate nodes provided between master node 110 and slave nodes 120.

Figure 3:
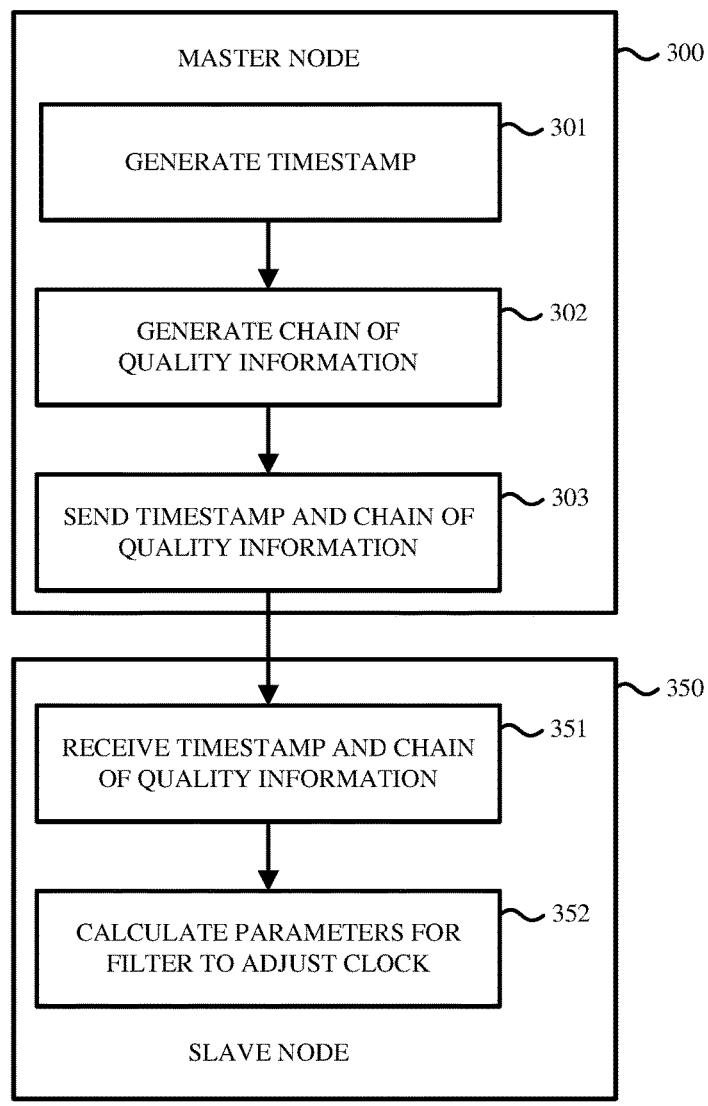
FIG. 3 is a flow diagram for explaining a time synchronization process between a slave node and a master node according to an embodiment herein.

FIG. 3 is a flow diagram illustrating a time synchronization process between a slave node and a master node according to an embodiment herein. In this regard, the following embodiments may be described as a process 300 and a process 350, which are usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc. Processes 300 and 350 may be performed by processing logic that includes hardware (e.g. circuitry, dedicated logic, etc.), software (e.g., embodied on a non-transitory computer readable medium), or a combination thereof.

In one example embodiment, process 300 is executed by master node 110 and process 350 is executed by slave nodes 120. In this regard, although processes 300 and 350 of FIG. 3 are described in connection with the network configuration illustrated in FIG. 1, it should be understood that these processes may be applied to other network configurations, including without limitation to network 200 of FIG. 2.

Referring to FIG. 3, at block 301 master node 110 generates a timestamp using its clock. The timestamp is included in a time synchronization message also generated by master node 110. At block 302, master node 110 generates a chain of quality information including a type of timestamping used by the master node 110 (e.g., hardware or software), a type of link used by master node 110 to send the time synchronization message including the timestamp (e.g., wired or wireless) and clock drift parameters of the clock of master node 110. Clock drift parameters may include information about how resistant the master clock is to drifting, or performance of the master clock's crystal relative to temperature of the crystal, and may be provided by a manufacturer of the clock. In cases where clock drift parameters are included in the chain of quality information, information indicating a temperature of the master clock may also be included. The chain of quality information may also include any other information regarding the accuracy of the clock of master node 110.

At block 303, master node 110 sends to slave nodes 120 the time synchronization message including the timestamp and the chain of quality information. Accordingly, in the embodiment of FIG. 3, the chain of quality information is included in the time synchronization message. However, in other embodiments, the chain of quality information may be provided in a separate quality message at a same or different timing than the time synchronization message. In this way, the chain of quality information need not be provided with the transmission of every time synchronization message, but may be provided one time or several times during a time synchronization session or process. For example, the chain of quality information may be provided during a session at any time characteristics relating to the chain of quality information change.

At block 351, slave nodes 120 receive the time synchronization message including the timestamp and the chain of quality information from master node 110. In embodiments in which the chain of quality information is provided separately, the chain of quality information is received separately from the time synchronization message. At block 352, slave nodes 120 calculates parameters for a filter that is applied to a sequence of timestamps received from master node 110 based on the timestamp and the chain of quality information received from master node 110. The filter may be applied over a time period (e.g. 10 seconds) to smooth the values of the received timestamps, and the parameters may be weights indicating how aggressive the filter is (e.g., an amount of filtering, attenuation or smoothing resulting from the filter).

In this regard, when synchronizing its own clock with that of master node 110, each of slave nodes 120 relates the timestamp received by master node 110 to a local timestamp generated by the local clock of the slave node indicating the time of receipt of the timestamp from master node 110, for instance by calculating a ratio. Typically, master node 110 sends time synchronization messages including a timestamp at some time interval (e.g., 100 milliseconds). Slave node 120 receives the series of timestamps from master node 110 over some time period and stores the timestamps in a memory or buffer. Since the timestamps typically include some amount of noise, slave node 120 filters the sequence of timestamps in order to estimate the correct relationship between the local clock and the master clock. This relationship between the local clock and the master clock allows slave node 120 to adjust its own clock to generate timestamps that are closer to being in synchronization with the master clock. In other embodiments, slave node 120 processes the sequence of timestamps in order to calculate a correction value or an offset for the received timestamp. The relationship between the slave clock and the master clock and/or the correction values may be stored by slave nodes 120 in a look up table, or as a function representing the relationship.

When calculating parameters for the filter, slave nodes 120 determine whether a received timestamp is reliable, since the appropriate amount of filtering depends on the reliability of the received timestamp. Generally, if it is determined from the chain of quality information that the clock generating a received timestamp is reliable (e.g., a clock generated by a hardware-implementation) and that the link over which the timestamp was sent is reliable (e.g., a wired link), slave nodes 120 determine that the timestamp is reliable. In these cases, less filtering is needed to perform accurate time synchronization. Also, slave nodes 120 may decrease the number of timestamps received from master node 110 for filtering, since fewer timestamps may be needed to accurately estimate the master clock. For example, slave nodes 120 may shorten the time period over which timestamps are received by master node 110, thereby decreasing the number of timestamps received.

On the other hand, if it is determined from the chain of quality information that the clock generating a received timestamp is unreliable (e.g., a clock generated by a software-implementation) and that the link over which the timestamp is provided is unreliable (e.g., a wireless link), and that the timestamp is therefore unreliable, more filtering is needed to perform accurate time synchronization. In these cases, slave nodes 120 may increase the number of timestamps received from master node 110 for filtering, since more timestamps may be needed to accurately estimate the master clock. For example, slave nodes 120 may increase the time period over which timestamps are received by master node 110, thereby increasing the number of timestamps received.

Accordingly, if the chain of quality information indicates that master node 110 generates timestamps using hardware-implemented timestamping and sends time synchronization messages over an Ethernet link, less filtering is generally needed for accurate time synchronization. On the other hand, if the chain of quality information indicates that master node 110 generates timestamps using software-implemented timestamping and sends time synchronization messages over a wireless link, more filtering is needed to get a similar level of accuracy for time synchronization.

In cases where the chain of quality information includes clock drift parameters indicating that the master clock is drifting (e.g., due to temperature), slave nodes 120 may decrease an amount of filtering applied to the sequence of timestamps.

As previously mentioned, the filter may smooth the received timestamps in order to estimate the relationship between the local clock and the master clock. In some embodiments, the filter is a low pass filter that passes timestamps having a value lower than a predetermined threshold and attenuates timestamps having values higher than the predetermined threshold, where the amount of attenuation depends on the parameters calculated by slave nodes 120 based on the chain of quality information received from master node 110. In this regard, timestamps having values higher than the predetermined threshold are reduced in amplitude by an amount determined by the parameters of the filter.

In other embodiments, the filter is a median filter that replaces each timestamp with the median of neighboring timestamps. A median filter is particularly useful in situations where received timestamps are unreliable such that they are outliers when determining the relationship between the slave clock and the master clock.

After parameters for the filter are determined and applied to a sequence of timestamps at block 352, slave nodes 120 may adjust their own clocks to generate timestamps that are closer to being in synchronization with the master clock. In one embodiment, slave nodes 120 then apply these adjusted timestamps to extract digital information that may be included in an audio or video signal that is being streamed from one node of the network to another and is played back in real time on a slave node. As one example, slave nodes 120 apply the adjusted timestamps to extract digital information that is in a bitstream received from master node 110. In other examples, any node of the network may be a source of the bitstream. Since slave nodes 120 use timestamps that have been adjusted according to process 300, it is possible to render the audio or video signal to produce smooth, uninterrupted content.

FIG. 4 is a flow chart illustrating time synchronization between a slave node and a master node having an intermediate node therebetween according to an embodiment herein in which chain of quality information is accumulated by the intermediate node. In this regard, the following embodiments may be described as a processes 400, 420 and 440, which are usually depicted as flowcharts, flow diagrams, structure diagrams, or block diagrams. Although a flowchart may describe the operations as a sequential process, many of the operations can be performed in parallel or concurrently. In addition, the order of the operations may be re-arranged. A process is terminated when its operations are completed. A process may correspond to a method, a procedure, etc. Processes 400, 420 and 440 may be performed by processing logic that includes hardware (e.g. circuitry, dedicated logic, etc.), software (e.g., embodied on a non-transitory computer readable medium), or a combination thereof.

In one example embodiment, process 400 is executed by master node 210, process 420 is executed by intermediate node 215 and process 440 is executed by slave node 220. In this regard, although processes 400, 420 and 440 of FIG. 4 are described in connection with the network configuration illustrated in FIG. 2, it should be understood that these processes may be applied to other network configurations, including without limitation to network 100 of FIG. 1.

Referring to FIG. 4, at block 401 master node 210 generates a timestamp using its clock. The timestamp is included in a time synchronization message also generated by master node 210. At block 402, master node 210 generates a chain of quality information including a type of timestamping used by the master node 210 (e.g., hardware or software), a type of link used by master node 210 to send the time synchronization message including the timestamp (e.g., wired or wireless) and clock drift parameters of the clock of master node 210. Clock drift parameters may include information about how resistant the master clock is to drifting, or performance of the master clock's crystal relative to temperature of the crystal, and may be provided by a manufacturer of the clock. In cases where clock drift parameters are included in the chain of quality information, information indicating a temperature of the master clock may also be included. The chain of quality information may also include any other information regarding the accuracy of the clock of master node 210.

At block 403, master node 210 sends to intermediate node 215 the time synchronization message including the timestamp and the chain of quality information. Accordingly, in the embodiment of FIG. 4, the chain of quality information is included in the time synchronization message. However, in other embodiments, the chain of quality information may be provided in a separate quality message at a same or different timing than the time synchronization message. In this way, the chain of quality information need not be provided with the transmission of every time synchronization message, but may be provided one time or several times during a time synchronization session or process. For example, the chain of quality information may be provided during a session at any time there is a change in characteristics relating to the chain of quality information.

At block 421, intermediate node 215 receives the time synchronization message including the timestamp and the chain of quality information from master node 210. In embodiments in which the chain of quality information is provided separately, the chain of quality information is received separately from the time synchronization message. At block 422, intermediate node 215 generates a local timestamp using its clock, and at block 423, intermediate node 215 generates local chain of quality information. This local chain of quality information includes a type of timestamping used by the intermediate node 215 (e.g., hardware or software), a type of link used by intermediate node 215 to send the time synchronization message including the timestamp (e.g., wired or wireless) and clock drift parameters of the clock of intermediate node 215. Clock drift parameters may include information about how resistant the local clock is to drifting, or performance of the clock's crystal relative to temperature of the crystal, and may be provided by a manufacturer of the clock. In cases where clock drift parameters are included in the chain of quality information, information indicating a temperature of the clock may also be included. The chain of quality information may also include any other information regarding the accuracy of the clock of intermediate node 215.

At block 424, intermediate node 215 generates accumulated chain of quality information by adding or appending its own local chain of quality information to the chain of quality information received from master node 210. In addition, intermediate node 215 includes its own local timestamp with the local chain of quality information. In embodiments where master node 210 provides the chain of quality information in the time synchronization message, the local chain of quality information and the local timestamp are also stored in the time synchronization message. In embodiments where the master node 210 provides the chain of quality information separate from the time synchronization message, the local chain of quality information and the local timestamp are included with the quality message or in a separate quality message.

Accordingly, in the embodiment of FIG. 4, intermediate node 215 does not process the chain of quality information received from master node 210 and instead accumulates the chain of quality information of the master node 210 with its own local chain of quality information to send to slave node 220 at block 425. In addition, at block 425, intermediate node 215 sends the timestamp received from master node 210 and the local timestamp generated at block 422.

At block 441, slave node 220 receives timestamps from all of the nodes in its upstream path, namely master node 210 and intermediate node 215. At block 441, slave node 220 also receives chain of quality information accumulated from all of the nodes in its upstream path, including local chain of quality information from intermediate node 215 and the chain of quality information received from master node 210.

In embodiments where there are additional intermediate nodes in between master node 210 and slave node 220 further to intermediate node 215, slave node 220 receives timestamps and chain of quality information accumulated from all of the nodes in its upstream path, including any of the additional intermediate nodes in the network 200.

At block 442, slave node 220 calculates parameters for a filter that is applied to the timestamps received in block 441 based on the received timestamps and the accumulated chain of quality information. The process of block 442 is similar to the process of block 352 of FIG. 3, and the details thereof will therefore not be discussed again here.

The embodiment of FIG. 4 is especially advantageous in cases where slave node 220 does not have strict time synchronization requirements, since the resources of intermediate node 215 may be saved by not having to process received chain of quality information. As one example, master node 210 may be a desktop computer connected by an Ethernet link 230 to intermediate node 215, and the intermediate node 215 may be a laptop computer connected by a wireless link to slave node 220 which may be an external electronic device. In this example, slave node 220 wants to synchronize its own local clock with the clock of master node 210 but also does not have strict time synchronization requirements. When master node 210 sends a time synchronization message including a timestamp to slave node 220 through intermediate node 215, the quality of the timestamp received by the intermediate node 215 may be high, since master node 210 uses Ethernet link 230. However, the quality of the timestamp received by the slave node 220 may be low, since intermediate node 215 uses wireless link 235. If slave node 220 does not have strict time synchronization requirements, it would be inefficient for intermediate node 215 to process the timestamp and chain of quality information received by master node 210, since slave node 220 does not need to receive a highly accurate timestamp. Accordingly, intermediate node 215 sends accumulated chain of quality information instead of processing the chain of quality information received from master node 210.

FIG. 5 is a flow chart illustrating time synchronization between a slave node and a master node having an intermediate node therebetween according to an embodiment herein in which chain of quality information is adjusted by the intermediate node. In this regard, the following embodiments may be described as a processes 500, 520 and 540, which are usually depicted as flowcharts, flow diagrams, structure diagrams, or block diagrams. Although a flowchart may describe the operations as a sequential process, many of the operations can be performed in parallel or concurrently. In addition, the order of the operations may be re-arranged. A process is terminated when its operations are completed. A process may correspond to a method, a procedure, etc. Processes 500, 520 and 540 may be performed by processing logic that includes hardware (e.g. circuitry, dedicated logic, etc.), software (e.g., embodied on a non-transitory computer readable medium), or a combination thereof.

In one example embodiment, process 500 is executed by master node 210, process 520 is executed by intermediate node 215 and process 540 is executed by slave node 220. In this regard, although processes 500, 520 and 540 of FIG. 4 are described in connection with the network configuration illustrated in FIG. 2, it should be understood that these processes may be applied to other network configurations, including without limitation to network 100 of FIG. 1.

Referring to FIG. 5, at block 501 master node 210 generates a timestamp using its clock. The timestamp is included in a time synchronization message also generated by master node 210. At block 502, master node 210 generates a chain of quality information including a type of timestamping used by the master node 210 (e.g., hardware or software), a type of link used by master node 210 to send the time synchronization message including the timestamp (e.g., wired or wireless) and clock drift parameters of the clock of master node 210. Clock drift parameters may include information about how resistant the master clock is to drifting, or performance of the master clock's crystal relative to temperature of the crystal, and may be provided by a manufacturer of the clock. In cases where clock drift parameters are included in the chain of quality information, information indicating a temperature of the master clock may also be included. The chain of quality information may also include any other information regarding the accuracy of the clock of master node 210.

At block 503, master node 210 sends to intermediate node 215 the time synchronization message including the timestamp and the chain of quality information. Accordingly, in the embodiment of FIG. 5, the chain of quality information is included in the time synchronization message. However, in other embodiments, the chain of quality information may be provided in a separate quality message at a same or different timing than the time synchronization message. In this way, the chain of quality information need not be provided with the transmission of every time synchronization message, but may be provided one time or several times during a time synchronization session or process. For example, the chain of quality information may be provided during a session at any time characteristics relating to the chain of quality information change.

At block 521, intermediate node 215 receives the time synchronization message including the timestamp and the chain of quality information from master node 210. In embodiments in which the chain of quality information is provided separately, the chain of quality information is received separately from the time synchronization message. At block 522, intermediate node 215 generates an adjusted timestamp and an adjusted chain of quality information based on the timestamp and the chain of quality information received from master node 210, as well as a local timestamp generated using the clock of intermediate node 215 and local chain of quality information. This local chain of quality information includes a type of timestamping used by the intermediate node 215 (e.g., hardware or software), a type of link used by intermediate node 215 to send the time synchronization message including the timestamp (e.g., wired or wireless) and clock drift parameters of the clock of intermediate node 215. Clock drift parameters may include information about how resistant the local clock is to drifting, or performance of the clock's crystal relative to temperature of the crystal, and may be provided by a manufacturer of the clock. In cases where clock drift parameters are included in the chain of quality information, information indicating a temperature of the clock may also be included. The chain of quality information may also include any other information regarding the accuracy of the clock of intermediate node 215.

With respect to the adjusted timestamp, intermediate node 215 performs a process similar to that at block 442 of FIG. 4 and block 352 of FIG. 3, in which parameters are determined for a filter that is applied to a sequence of received timestamps. In this way, intermediate node 215 processes the timestamp and the chain of quality information received from master node 210 to generate an adjusted timestamp that is more accurate with respect to the master clock. This adjusted timestamp is provided to slave node 220 at block 523.

With respect to the adjusted chain of quality information, intermediate node 215 processes the chain of quality information received from master node 210 and aggregates the information with its own local chain of quality information to re-compute an adjusted chain of quality information. For instance, master node 210 may be a desktop computer connected by a wireless link 230 to intermediate node 215, and the intermediate node 215 may be a laptop computer connected by a wired link to slave node 220 which may be an external electronic device. In this case, the chain of quality generated by master node 210 indicates that a link 230 between master node 210 and intermediate node 215 is unreliable and the local chain of quality information generated by intermediate node 215 indicates that the link 235 between intermediate node 215 and slave node 220 is reliable. However, according to the embodiment of FIG. 5, intermediate node 215 aggregates its own local chain of quality information (indicating reliability) with the master node's chain of quality information (indicating unreliability) to generate an adjusted chain of quality information indicating that the link quality is unreliable and sends the adjusted chain of quality information to slave node 220 at block 523.

At block 541, slave node 220 receives the adjusted timestamp and the adjusted chain of quality information from intermediate node 215. In embodiments where there are additional intermediate nodes in between master node 210 and slave node 220 further to intermediate node 215, each of the intermediate nodes performs the process 520 to generate an adjusted timestamp and adjusted chain of quality information. In these embodiments, slave node 220 receives an adjusted timestamp and adjusted chain of quality information from its neighboring upstream node (e.g. the intermediate node immediately upstream from slave node 220).

At block 542, slave node 220 calculates parameters for a filter that is applied to the timestamps received in block 541 based on the adjusted timestamp and the adjusted chain of quality information. The process of block 542 is similar to the process of block 352 of FIG. 3, and the details thereof will therefore not be discussed again here.

The embodiment of FIG. 5 is particularly advantageous in situations where network elements are connected over unreliable links such as wireless type links but synchronicity is desired. For example, in an automobile or in home entertainment system connected via a wireless network, it may be desirable for all network devices to have highly accurate time synchronization.

Figure 6:
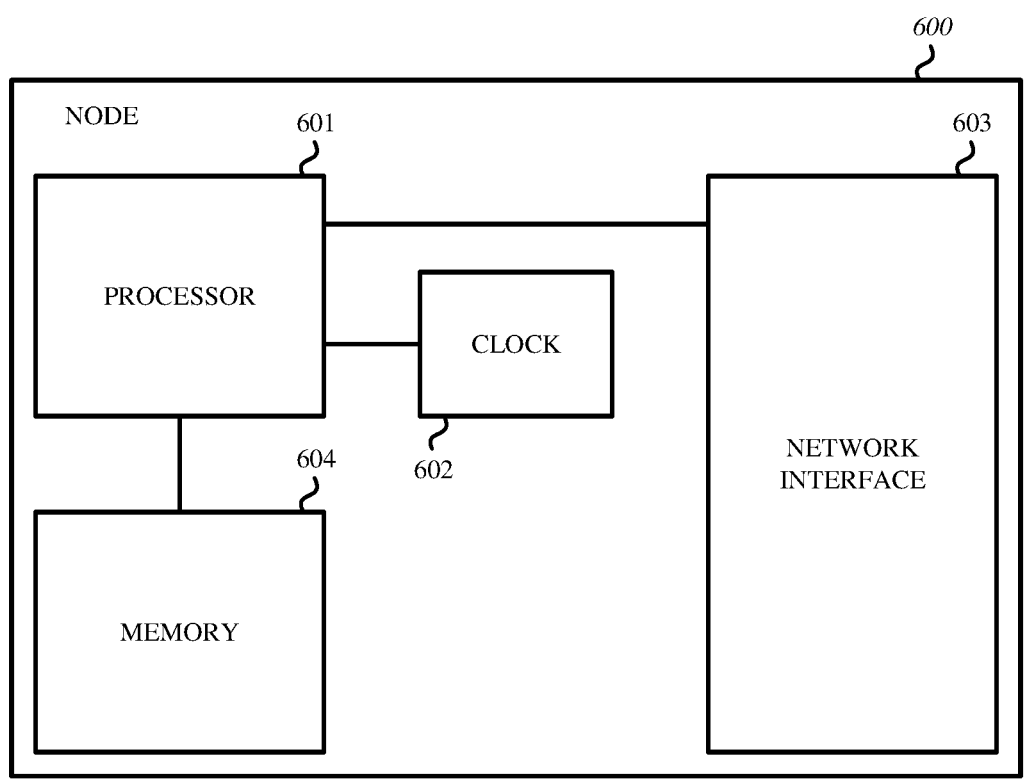
FIG. 6 is a representational view for explaining an example node according to embodiments herein.

FIG. 6 is a representational view illustrating an example node 600 according to embodiments herein. Node 600 is an example of nodes 110, 120, 210, 215 and 220 used for implementing the techniques disclosed herein. Node 600 includes a processor 601, which can include one or more processing devices. Examples of processor 601 include without limitation a microprocessor, an application-specific integrated circuit (ASIC), a state machine, or other suitable processing device. Processor 601 is communicatively coupled to a computer-readable storage medium, such as memory 604, and accesses information stored in memory 604, such as timestamps and chain of quality information. Memory 604 also stores computer-executable instructions that when executed by processor 601 cause the processor 601 to perform the operations described herein. Memory 604 may be, for example, solid-state memories, optical and magnetic media or any other non-transitory machine-readable medium. Non-limiting examples of memory 604 include a hard drive, compact disc, flash memory, non-volatile memory, volatile memory, magnetic disk(s), etc. Node 600 also includes a network interface 603 for communicating with other nodes of the network, and clock 602 for generating timestamps. As discussed above, clock 602 may be implemented by hardware or by software.

FIG. 6 is merely one example of a particular implementation and is merely to illustrate the types of components that may be present in a node. While the node 600 is illustrated with various components, it is not intended to represent any particular architecture or manner of interconnecting the components; as such details are not germane to the embodiments herein. It will also be appreciated that network computers, handheld computers, mobile phones, servers, and/or other data processing systems which have fewer components or perhaps more components may also be used with the embodiments herein. Accordingly, the processes described herein are not limited to use with the hardware and software of FIG. 6.

Figure 7:
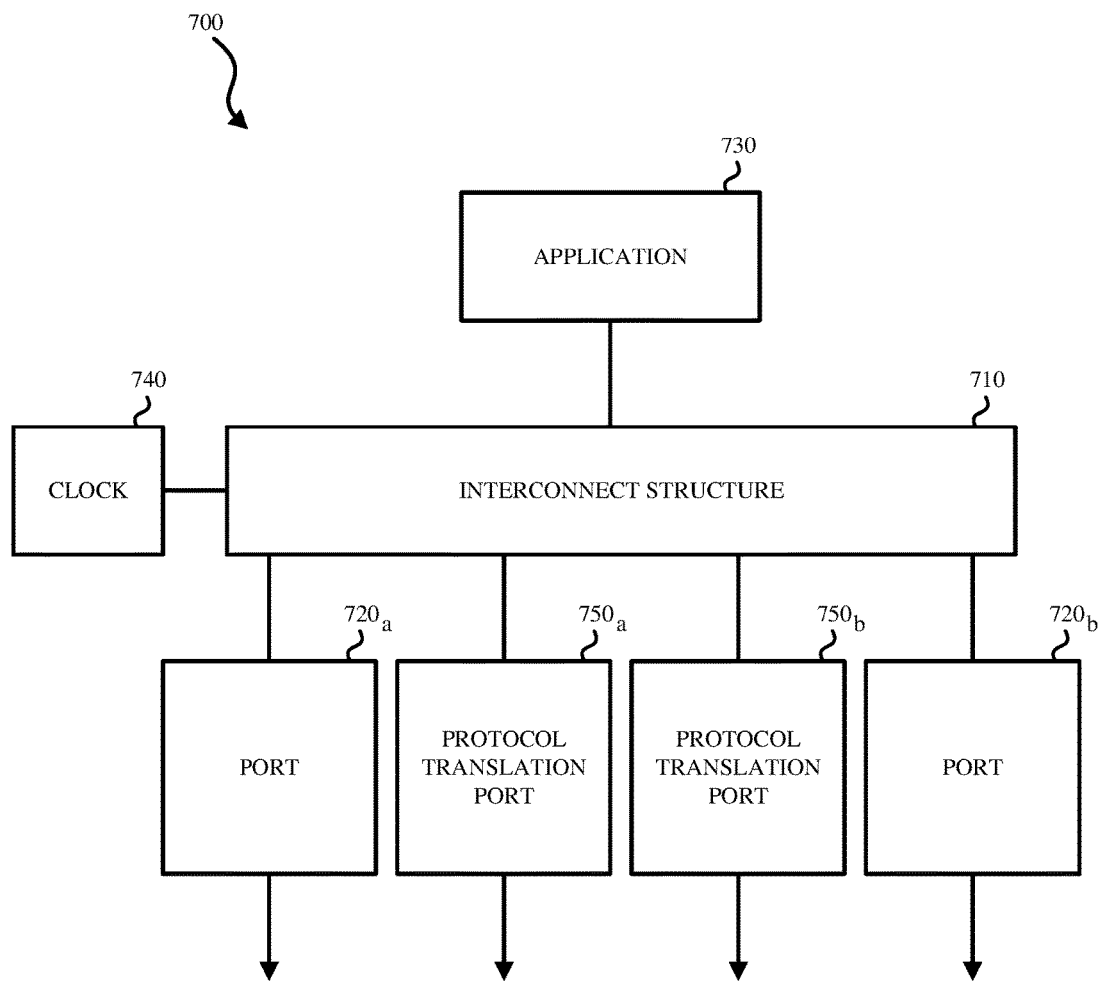
FIG. 7 is a representational view for explaining an example bridge element according to embodiments herein in which nodes use clock synchronization transport protocols.

FIG. 7 illustrates a block diagram for explaining a bridge element according to an embodiment in which nodes of the network share time synchronization messages using clock synchronization transport protocols. While the bridge element 700 is illustrated with various components, it is not intended to represent any particular architecture or manner of interconnecting the components; as such details are not germane to the embodiments herein. It will also be appreciated that network computers, handheld computers, mobile phones, servers, and/or other data processing systems which have fewer components or perhaps more components may also be used with the embodiments herein. Accordingly, the processes described herein are not limited to use with the hardware and software of FIG. 7.

In the embodiment of FIG. 7, network elements (such as nodes 110, 120, 210, 215, 220) use different clock synchronization transport protocols, such as those according to IEEE 802.1AS and IEEE 1588. IEEE 802.1AS is defined for wired Ethernet and may define various different protocols to transport time synchronization messages (on a peer to peer basis or on a link by link basis, for example). IEEE 802.1AS is a profile of IEEE 1588 which also defines various different protocols to transport time synchronization messages (e.g., on a unicast basis or multicast basis). Precise Time Protocol (PTP) is specified in IEEE 1588 and may use user datagram protocol (UDP) as its transport protocol or Ethernet as its transport protocol.

In situations where network elements use different clock synchronization transport protocols to share time synchronization messages, it may be advantageous to bridge between the different types of clock synchronization transport protocols in order to facilitate accurate synchronization of time across the network elements. Referring to the example node illustrated in FIG. 6, a node 600 includes a local clock 602 and uses a clock synchronization transport protocol, such that the node has its own time domain. In a network (such as networks 100 and 200), each node may run on its own time domain.

By way of background, conventionally, in order to negotiate between different time domains of the network elements, a best master clock algorithm is typically used to first elect a "best" clock (sometimes called a "grandmaster") to which all other clocks of the network synch. The best master clock algorithm used by each clock synchronization transport protocol may be different. As one example, each node or network element of the network (such as networks 100 and 200) may share an announce message including information regarding a local clock that is used to generate a value, and the values generated by the network elements are compared to find the lowest which is selected as the grandmaster. After the grandmaster is selected, time synchronization messages are passed at an application layer after processing is performed on the time synchronization messages to negotiate the time boundary between the two time domains.

In the embodiment of FIG. 7, bridge element 700 includes interconnect structure 710, an application layer 730, clock 740 for generating a clock synchronization signal that may be included in time synchronization messages shared across a network, ports 720a and 720b constructed to receive and send data (including a clock synchronization signal) according to a clock synchronization transport protocol and protocol translation ports 750a and 750b constructed to translate between clock synchronization transport protocols, and to receive and send data (including a clock synchronization signal) according to various clock synchronization transport protocols. Although the embodiment of FIG. 7 shows two ports 720a and 720b and two protocol translation ports 750a and 750b, any number of such ports may be included in other embodiments, including one or more than two. By virtue of the arrangement explained by FIG. 7, and particularly by using ports that are able to translate between clock synchronization transport protocols (such as IEEE 802.1AS and IEEE 1588), bridge element 700 may provide a time synchronization message including a clock synchronization signal from a node using a first clock synchronization transport protocol directly to a node using a second clock synchronization transport protocol. For example, bridge element 700 may send the clock synchronization signal from a node using IEEE 802.1AS directly to a node using IEEE 1588, and vice versa. Since bridge element 700 may translate between the clock synchronization transport protocols (such as IEEE 802.1AS and IEEE 1588), it is possible to share time synchronization messages using one time domain (i.e., without negotiating a second time domain) and accuracy is thereby improved.

For instance, in an embodiment in which the network (such as networks 100 and 200) have three network elements, it may be assumed that a first node uses IEEE 802.1AS as its clock synchronization transport protocol (see, for example, FIG. 8 below) and that a second node uses IEEE 1588 as its clock synchronization transport protocol. Referring to FIG. 7, in the case that bridge element receives a clock synchronization signal from the first node using IEEE802.1AS, one of ports 750a and 750b of bridge element 700 receives the clock synchronization signal from the first node. Ports 750a and 750b may be, as one example, PortSyncs defined by IEEE 802.1AS and may share time synchronization messages with other network elements also using IEEE 802.1AS as their clock synchronization transport protocol. Interconnect structure 710, which is, as one example, a SiteSync defined by IEEE 802.1AS, receives the clock synchronization signal from one of ports 750a and 750b. One of protocol translation ports 750a and 750b receives the clock synchronization signal from the interconnect structure 710, translates the clock synchronization signal between IEEE 802.1AS and IEEE 1588, and provides the translated clock synchronization signal to the second network element using IEEE 1588. Thus, in one example embodiment, protocol translation ports 750a and 750b share time synchronization messages with network elements using IEEE 1588 as their clock synchronization transport protocol.

On the other hand, in the case that bridge element receives a clock synchronization signal from the second node using IEEE 1588, one of protocol translation ports 750a and 750b receives the clock synchronization signal from the second node, translates the clock synchronization signal between IEEE 1588 and IEEE 802.1AS, and provides the translated clock synchronization signal to interconnect structure 710. Interconnect structure 710 receives the translated clock synchronization signal from the ports 750a and 750b and provides it to one of ports 720a and 720b. One of ports 720a and 720b receives the translated clock synchronization signal from interconnect structure 710 and provides the translated clock synchronization signal to the first node using IEEE 802.1AS.

There may also be in a case in which the bridge element generates the clock synchronization signal itself. In these cases, clock 740 generates a clock synchronization signal. Interconnect structure 710 receives the clock synchronization signal from the clock 740. One of ports 720a and 720b receives the clock synchronization signal from the interconnect structure and provides the clock synchronization signal to the first node using IEEE 802.1AS. One of protocol translation ports 750a and 750b receives the clock synchronization signal from the interconnect structure 710, translates the clock synchronization signal between IEEE 802.1AS and IEEE 1588, and provides the translated clock synchronization signal to the second network element using IEEE 1588.

Furthermore, according to one example embodiment, IEEE 1588 v2 (PTP) End to End synchronization is used as a mechanism for synchronizing disjointed IEEE 802.1AS (gPTP) domains. In this embodiment, the PTP E2E is advantageously integrated with the gPTP domain. By way of background, conventional approaches typically use PTP boundary clocks and have a time domain boundary between the PTP E2E clock and the gPTP domain. In contrast, according to this example embodiment, the PTP E2E link is used as another type of full duplex point to point port within the time aware system, thereby extending the gPTP domain across the IP link and creating one gPTP domain rather than 2 gPTP domains with 2 boundary clocks and time being derived across boundary clocks. This then allows for the use of the gPTP algorithms to share a common clock amongst all of these systems. In this embodiment, the network (for example, network 100 and 200) is capable of sending and receiving Ethernet and/or IP packets. This is supported on both wired and wireless networks. The embodiment may be part of the software implementation of the IEEE 802.1 standard. IEEE Standard 802.1AS ("IEEE Standard for Local and Metropolitan Area Networks—Timing and Synchronization for Time-Sensitive Applications in Bridged Local Area Networks"), which is incorporated herein by reference in its entirety, provides mechanisms for synchronizing frequency of clocks, and for measuring the propagation delay across a link. It also provides a NIC-to-bridge interface in bridged network, and NIC-to-NIC in a two-machine network. It is based on IEEE 1588, and requires ingress/egress time stamping in the MAC (i.e., Sync, PDelay_Request, and PDelay_Response frames time-stamped on egress and ingress).

Figure 8:
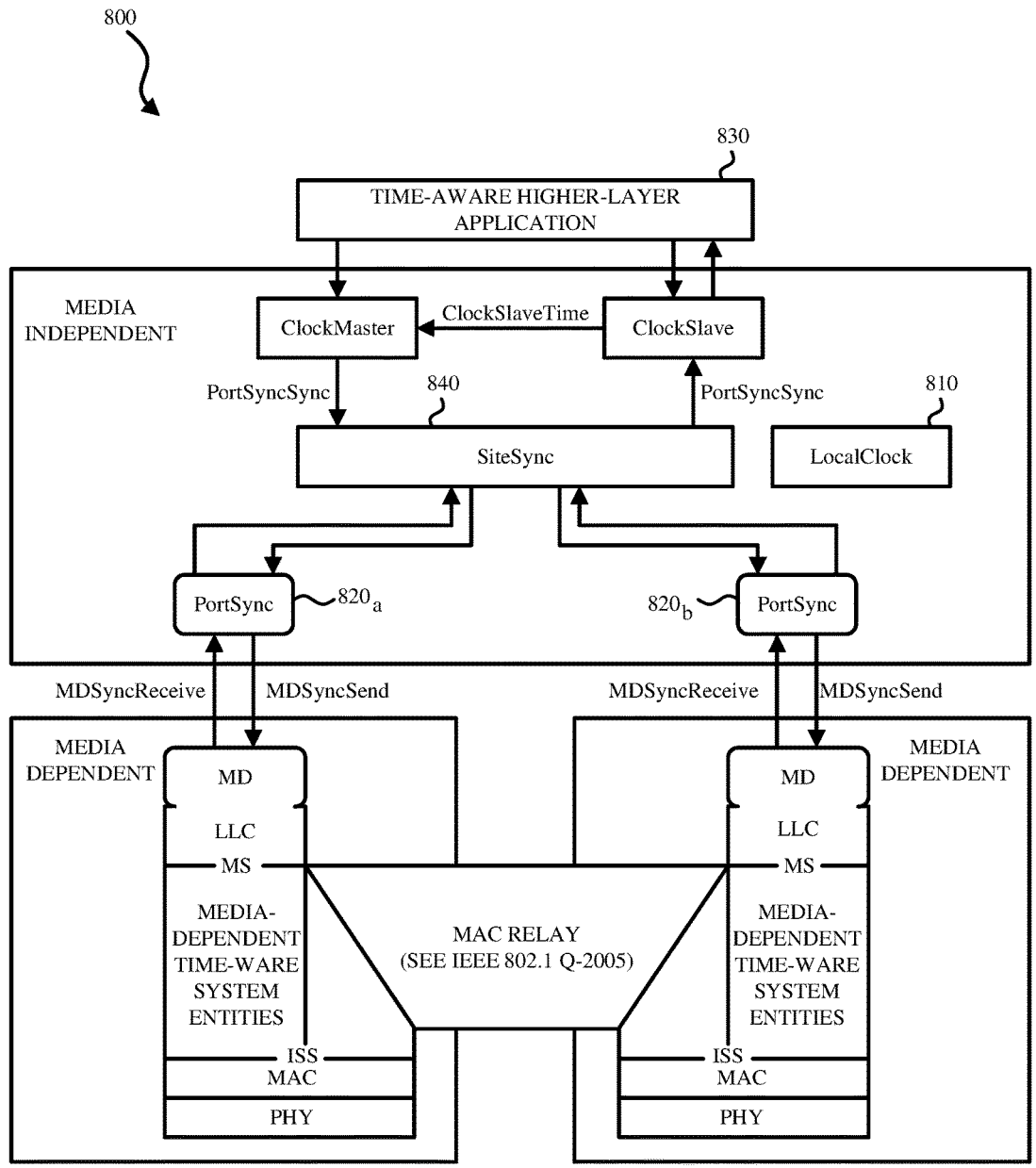
FIG. 8 is a representation view for explaining an example node using IEEE 802.1AS as its clock synchronization transport protocol according to an embodiment herein.

FIG. 8 illustrates an example node or network element 800 using IEEE 802.1AS as its clock synchronization transport protocol. Node 800 includes local clock 810 and has a first time domain, an interconnect structure such as Site-Synch 840, and ports such as PortSync 820a and 820b. In a network (such as networks 100 and 200), a similar and separate structure may also be running independently for a different node using IEEE 1588 as its clock synchronization transport protocol and having a second time domain. According to conventional approaches, in a network including node 800 and a node using IEEE 1588 as its clock synchronization transport protocol (not shown), the time synchronization messages are passed at the time-aware higher-layer application level 830 after processing is performed on the time synchronization messages to negotiate the time boundary between the two time domains.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the structures and processes disclosed herein may be performed by one or more programmable processors executing one or more computer programs stored on a non-transitory computer readable storage medium to perform the functions of the system. All or part of the network may be implemented as, special purpose logic circuitry (e.g., an FPGA (field-programmable gate array) and/or an ASIC (application-specific integrated circuit)). All or part of the network may be implemented using electronic hardware circuitry that include electronic devices such as, for example, at least one of a processor, a memory, a programmable logic device or a logic gate. Further, processes can be implemented in any combination hardware devices and software components.

While certain embodiments have been described and shown in the accompanying drawings, it is to be understood that such embodiments are merely illustrative of and not restrictive, and the embodiments are not limited to the specific constructions and arrangements shown and described, since various other modifications may occur to those of ordinary skill in the art. The description is thus to be regarded as illustrative instead of limiting.

The invention claimed is:

1. A bridge element for establishing clock synchronization across network elements for exchanging audio data, including a first network element using a first clock synchronization transport protocol and a second network element using a second clock synchronization transport protocol different from the first clock synchronization transport protocol, the bridge element comprising:
 a port constructed to receive a clock synchronization signal from the first network element using the first clock synchronization protocol;
 an interconnect structure constructed to receive the clock synchronization signal from the port;
 a protocol translation port constructed to receive the clock synchronization signal from the interconnect structure, to translate the clock synchronization signal between the first clock synchronization transport protocol and the second clock synchronization transport protocol wherein the first and second clock synchronization protocols define different protocols to transmit time synchronization messages wherein the first clock synchronization transport protocol is IEEE 802.1AS and the second clock synchronization transport protocol is IEEE 1588, and to provide the translated clock synchronization signal to the second network element using the second clock synchronization protocol, wherein the second network element is to exchange the audio data using the translated clock synchronization signal.

2. The bridge element of claim 1, further comprising:
a clock for generating a second clock synchronization signal, wherein:
the interconnect structure is further constructed to receive the second clock synchronization signal from the clock;
the port is further constructed to receive the second clock synchronization signal from the interconnect structure and to provide the second clock synchronization signal to the first network element using the first clock synchronization protocol; and
the protocol translation port is further constructed to receive the second clock synchronization signal from the interconnect structure, to translate the second clock synchronization signal between the first clock synchronization transport protocol and the second clock synchronization transport protocol, and to provide the translated second clock synchronization signal to the second network element using the second clock synchronization protocol.

3. A bridge element for establishing clock synchronization across network elements for exchanging audio data, including a first network element using a first clock synchronization transport protocol and a second network element using a second clock synchronization transport protocol different from the first clock synchronization transport protocol, the bridge element comprising:
a protocol translation port constructed to receive a clock synchronization signal from the first network element using the first clock synchronization transport protocol, to translate the clock synchronization signal between the first clock synchronization transport protocol and the second clock synchronization transport protocol wherein the first and second clock synchronization protocols define different protocols to transmit time synchronization messages, the first clock synchronization transport protocol being IEEE 802.1AS and the second clock synchronization transport protocol being IEEE 1588;
an interconnect structure constructed to receive the translated clock synchronization signal from the protocol translation port; and
a port constructed to receive the translated clock synchronization signal from the interconnect structure and to provide the translated clock synchronization signal to the second network element using the second clock synchronization protocol, wherein the second network element is to exchange the audio data using the translated clock synchronization signal.

4. A method for establishing clock synchronization across network elements for exchanging audio data, including a first network element using a first clock synchronization transport protocol and a second network element using a second clock synchronization transport protocol different from the first clock synchronization transport protocol, the method comprising:
receiving, by a port, a clock synchronization signal from the first network element using the first clock synchronization protocol;
receiving, by an interconnect structure, the clock synchronization signal from the port;
receiving, by a protocol translation port, the clock synchronization signal from the interconnect structure;
translating, by the protocol translation port, the clock synchronization signal between the first clock synchronization transport protocol and the second clock synchronization transport protocol wherein the first and second clock synchronization protocols define different protocols to transmit time synchronization messages, the first clock synchronization transport protocol being IEEE 802.1AS and the second clock synchronization transport protocol being IEEE 1588; and
providing the translated clock synchronization signal to the second network element using the second clock synchronization protocol, wherein the second network element is to exchange the audio data using the translated clock synchronization signal.

5. The method of claim 4, further comprising:
generating, by a clock, a second clock synchronization signal;
receiving, by the interconnect structure, the second clock synchronization signal from the clock;
receiving, by the port, the second clock synchronization signal from the interconnect structure and providing the second clock synchronization signal to the first network element using the first clock synchronization protocol; and
receiving, by the protocol translation port, the second clock synchronization signal from the interconnect structure, translating the second clock synchronization signal between the first clock synchronization transport protocol and the second clock synchronization transport protocol, and providing the translated second clock synchronization signal to the second network element using the second clock synchronization protocol.

6. A method for establishing clock synchronization across network elements for exchanging audio data, including a first network element using a first clock synchronization transport protocol and a second network element using a second clock synchronization transport protocol different from the first clock synchronization transport protocol, the method comprising:
receiving, by a protocol translation port, a clock synchronization signal from the first network element using the first clock synchronization transport protocol;
translating, by the protocol translation port, the clock synchronization signal between the first clock synchronization transport protocol and the second clock synchronization transport protocol wherein the first and second clock synchronization protocols define different protocols to transmit time synchronization messages, the first clock synchronization transport protocol being IEEE 802.1AS and the second clock synchronization transport protocol being IEEE 1588;
receiving, by an interconnect structure, the translated clock synchronization signal from the protocol translation port; and
receiving, by a port, the translated clock synchronization signal from the interconnect structure and providing the translated clock synchronization signal to the second network element using the second clock synchronization protocol wherein the second network element is to exchange the audio data using the translated clock synchronization signal.

7. A non-transitory computer-readable storage medium storing executable program instructions which when executed by a bridge element cause the bridge element to perform a method for establishing clock synchronization across network elements for exchanging audio data, including a first network element using a first clock synchronization transport protocol and a second network element using a second clock synchronization transport protocol different from the first clock synchronization transport protocol, the method comprising:

receiving, by a port, a clock synchronization signal from the first network element using the first clock synchronization transport protocol;

receiving, by an interconnect structure, the clock synchronization signal from the port;

receiving, by a protocol translation port, the clock synchronization signal from the interconnect structure;

translating, by the protocol translation port, the clock synchronization signal between the first clock synchronization transport protocol and the second clock synchronization transport protocol wherein the first and second clock synchronization protocols define different protocols to transmit time synchronization messages, the first clock synchronization transport protocol being IEEE 802.1AS and the second clock synchronization transport protocol being IEEE 1588; and providing the translated clock synchronization signal to the second network element using the second clock synchronization protocol wherein the second network element is to exchange the audio data using the translated clock synchronization signal.

8. The non-transitory computer-readable storage medium of claim 7, further comprising:

generating, by a clock, a second clock synchronization signal;

receiving, by the interconnect structure, the second clock synchronization signal from the clock;

receiving, by the port, the second clock synchronization signal from the interconnect structure and providing the second clock synchronization signal to the first network element using the first clock synchronization protocol; and receiving, by the protocol translation port, the second clock synchronization signal from the interconnect structure, translating the second clock synchronization signal between the first clock synchronization transport protocol and the second clock synchronization transport protocol, and providing the translated second clock synchronization signal to the second network element using the second clock synchronization protocol.

9. A non-transitory computer-readable storage medium storing executable program instructions which when executed by a bridge element cause the bridge element to perform a method for establishing clock synchronization across network elements for exchanging audio data, including a first network element using a first clock synchronization transport protocol and a second network element using a second clock synchronization transport protocol different from the first clock synchronization transport protocol, the method comprising:

receiving, by a protocol translation port, a clock synchronization signal from the first network element using the first clock synchronization transport protocol;

translating, by the protocol translation port, the clock synchronization signal between the first clock synchronization transport protocol and the second clock synchronization transport protocol wherein the first and second clock synchronization protocols define different protocols to transmit time synchronization messages, the first clock synchronization transport protocol being IEEE 802.1AS and the second clock synchronization transport protocol being IEEE 1588;

receiving, by an interconnect structure, the translated clock synchronization signal from the protocol translation port; and receiving, by a port, the translated clock synchronization signal from the interconnect structure and providing the translated clock synchronization signal to the second network element using the second clock synchronization transport protocol wherein the second network element is to exchange the audio data using the translated clock synchronization signal.

* * * * *